US008432310B1

(12) United States Patent
Pogemiller et al.

(10) Patent No.: US 8,432,310 B1
(45) Date of Patent: Apr. 30, 2013

(54) SYSTEM AND METHOD FOR PROVIDING A HEIGHT-OF-BURST (HOB) SENSOR USING GLOBAL POSITIONING SYSTEM (GPS) MULTIPATH

(75) Inventors: James A. Pogemiller, Cedar Rapids, IA (US); Frank E. Marcum, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 217 days.

(21) Appl. No.: 12/968,904

(22) Filed: Dec. 15, 2010

(51) Int. Cl.
*G01S 19/42* (2010.01)
(52) U.S. Cl.
USPC .................................... 342/357.25
(58) Field of Classification Search ............... 342/357.25
See application file for complete search history.

(56) References Cited

U.S. PATENT DOCUMENTS

| | | | |
|---|---|---|---|
| 2008/0202324 A1* | 8/2008 | Steele | 89/1.11 |
| 2011/0006941 A1* | 1/2011 | Samukawa et al. | 342/70 |

OTHER PUBLICATIONS

Braasch, M.S., "Autocorrelation Sidelobe Considerations in the Characterization of Mulitpath Errors," IEEE Transactions on Aerospace and Electronic Systems, vol. 33, No. 1, Jan. 1997, pp. 290-295.
Katzberg, Stephen J., et al., "Simple Over-Water Altimeter Using GPS Reflections," ION GPS '99, Sep. 14-17, 1999, Nashville, TN, pp. 1819-1827.

* cited by examiner

*Primary Examiner* — Harry Liu
(74) *Attorney, Agent, or Firm* — Donna P. Suchy; Daniel M. Barbieri

(57) ABSTRACT

The present invention is a method for utilizing a positioning receiver, such as a GPS receiver, as a height of burst sensor. The method uses the difference in time-of-flight between a line-of-sight (ex.—on-time, direct) GPS signal and a multipath (ex.—delayed, reflected) GPS signal to determine distance and time to the ground. This may be accomplished with a high degree of accuracy due to the precision timing capabilities of the GPS.

20 Claims, 3 Drawing Sheets

SYSTEM AND METHOD FOR PROVIDING A HEIGHT-OF-BURST (HOB) SENSOR USING GLOBAL POSITIONING SYSTEM (GPS) MULTIPATH

FIELD OF THE INVENTION

The present invention relates to the field of navigation systems and particularly to a system and method for providing a Height-of-Burst (HOB) sensor using Global Positioning System (GPS) multipath.

BACKGROUND OF THE INVENTION

A Height-of-Burst (HOB) sensor may be implemented in munitions to allow for precision delivery of explosive bursts so as to maximize impact and minimize collateral damage. A Global Positioning System (GPS) receiver is a precise timing device which estimates, with a high degree of accuracy, the time of flight of an encoded electromagnetic signal from an orbiting satellite. For example, these precision estimates may be provided using a NavStorm™+ GPS receiver produced by Rockwell Collins. From these precision estimates, a navigation solution (ex.—position, velocity, and time) may be provided to the end user. Typical HOB devices require hardware which may increase costs and volume requirements for munitions, while also complicating integration of the guidance and navigation system. Further, currently available HOB devices require broadcast of signals which may be detectable by enemy forces. Thus, it would be desirable to provide a system which obviates problems associated with current solutions.

SUMMARY OF THE INVENTION

Accordingly, an embodiment of the present invention is directed to a positioning receiver for implementation on-board a vehicle, said positioning receiver including: a receiving unit, the receiving unit being configured for receiving a plurality of positioning signals including direct path positioning signals and at least one reflected positioning signal; and a processor, the processor being connected to the receiving unit, the processor being configured for: receiving Radio Frequency (RF) inputs from the receiving unit, said RF inputs including the received signals; separating the direct path positioning signals from the at least one reflected positioning signal; generating positional data for the vehicle based upon the direct path positioning signals; determining a time-of-flight value for at least one of the direct path positioning signals; determining a time-of-flight value for the at least one multipath positioning signal; determining a difference between the time-of-flight value of the at least one direct path positioning signal and the time-of-flight value of the at least one multipath positioning signal; and calculating the height above ground of the vehicle based upon the difference between the time-of-flight value of the at least one direct path positioning signal and the time-of-flight value of the at least one multipath positioning signal.

An additional embodiment of the present invention is directed to a positioning system for implementation on-board a vehicle, said positioning system including: a receiving unit, the receiving unit being configured for receiving a plurality of satellite navigation signals, said plurality of satellite navigation signals including direct path positioning signals and at least one reflected positioning signal; a processor, the processor being connected to the receiving unit, the processor being configured for: receiving Radio Frequency (RF) inputs from the receiving unit, said RF inputs including the received signals; separating the direct path positioning signals from the at least one reflected positioning signal; generating positional data for the vehicle based upon the direct path positioning signals; determining a time-of-flight value for at least one of the direct path positioning signals; determining a time-of-flight value for the at least one multipath positioning signal; determining a difference between the time-of-flight value of the at least one direct path positioning signal and the time-of-flight value of the at least one multipath positioning signal; calculating the height above ground of the vehicle based upon the difference between the time-of-flight value of the at least one direct path positioning signal and the time-of-flight value of the at least one multipath positioning signal; and outputting the determined height above ground via an interface; and a fuze, said fuze being connected to the processor via the interface, said fuze being configured for receiving the output determined height above ground from the processor.

A further embodiment of the present invention is directed to a method for in-flight determination of a height above ground for a vehicle via a positioning receiver, said method including: receiving a plurality of positioning signals including direct path positioning signals and at least one multipath positioning signal; providing Radio Frequency (RF) inputs including the received signals to a processor of the positioning receiver; separating the direct path positioning signals from the at least one multipath positioning signal; generating positional data for the vehicle utilizing the direct path positioning signals; determining a time-of-flight value for at least one of the direct path positioning signals; determining a time-of-flight value for the at least one multipath positioning signal; determining a difference between the time-of-flight value of the at least one direct path positioning signal and the time-of-flight value of the at least one multipath positioning signal; calculating the height above ground of the vehicle based upon the difference between the time-of-flight value of the at least one direct path positioning signal and the time-of-flight value of the at least one multipath positioning signal; and outputting the determined height above ground to at least one of: a mission processor; a triggering mechanism; and a fuze.

A computer program product, including: a non-transitory computer-readable storage medium including computer-usable program code for performing a method for in-flight determination of a height above ground for a vehicle via a positioning receiver, the computer program product including: computer-usable program code for receiving a plurality of positioning signals including direct path positioning signals and at least one multipath positioning signal; computer-usable program code for providing Radio Frequency (RF) inputs including the received signals to a processor of the positioning receiver; computer-usable program code for separating the direct path positioning signals from the at least one multipath positioning signal; computer-usable program code for generating positional data for the vehicle utilizing the direct path positioning signals; computer-usable program code for determining a time-of-flight value for at least one of the direct path positioning signals; computer-usable program code for determining a time-of-flight value for the at least one multipath positioning signal; computer-usable program code for determining a difference between the time-of-flight value of the at least one direct path positioning signal and the time-of-flight value of the at least one multipath positioning signal; computer-usable program code for calculating the height above ground of the vehicle based upon the difference between the time-of-flight value of the at least one direct path positioning signal and the time-of-flight value of the at least one multipath positioning signal; and computer-usable program code for outputting the determined height above ground to at least one of: a mission processor; a triggering mechanism; and a fuze.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present disclosure may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

A Height-of-Burst (HOB) sensor may be implemented in munitions to allow for precision delivery of explosive bursts so as to maximize impact and minimize collateral damage. A Global Positioning System (GPS) receiver is a precise timing device which estimates, with a high degree of accuracy, the time of flight of an encoded electromagnetic signal from an orbiting satellite. For example, these precision estimates may be provided using a NavStorm™+ GPS receiver produced by Rockwell Collins. From these precision estimates, a navigation solution (ex.—position, velocity, and time) may be provided to the end user. Typical HOB devices require hardware which may increase costs and volume requirements for munitions, while also complicating integration of the guidance and navigation system. By modifying a GPS receiver, such as a Rockwell Collins NavStorm™+ GPS receiver, to provide HOB functionality in addition to an accurate navigation solution, hardware requirements and integration complexity may be reduced at a cost savings to the customer.

A GPS receiver is capable of being used as a bi-static radar and range finder if the direct (line of site) time of flight values and the delayed (multipath) time of flight values from the same satellite vehicle (SV) are known. This idea may be easily progressed to a HOB sensor that may determine the path length difference between the line of sight and multipath signals. From this difference, a height above the ground may be estimated. Applying this to munitions equipped with a GPS receiver that is modified to acquire and track very low strength multipath signals allows for an estimation of time to impact. Thus, in accordance with the present disclosure, the GPS receiver may be modified to provide the functionality of currently available HOB sensors, while requiring less hardware and integration complexity.

Figure 1:
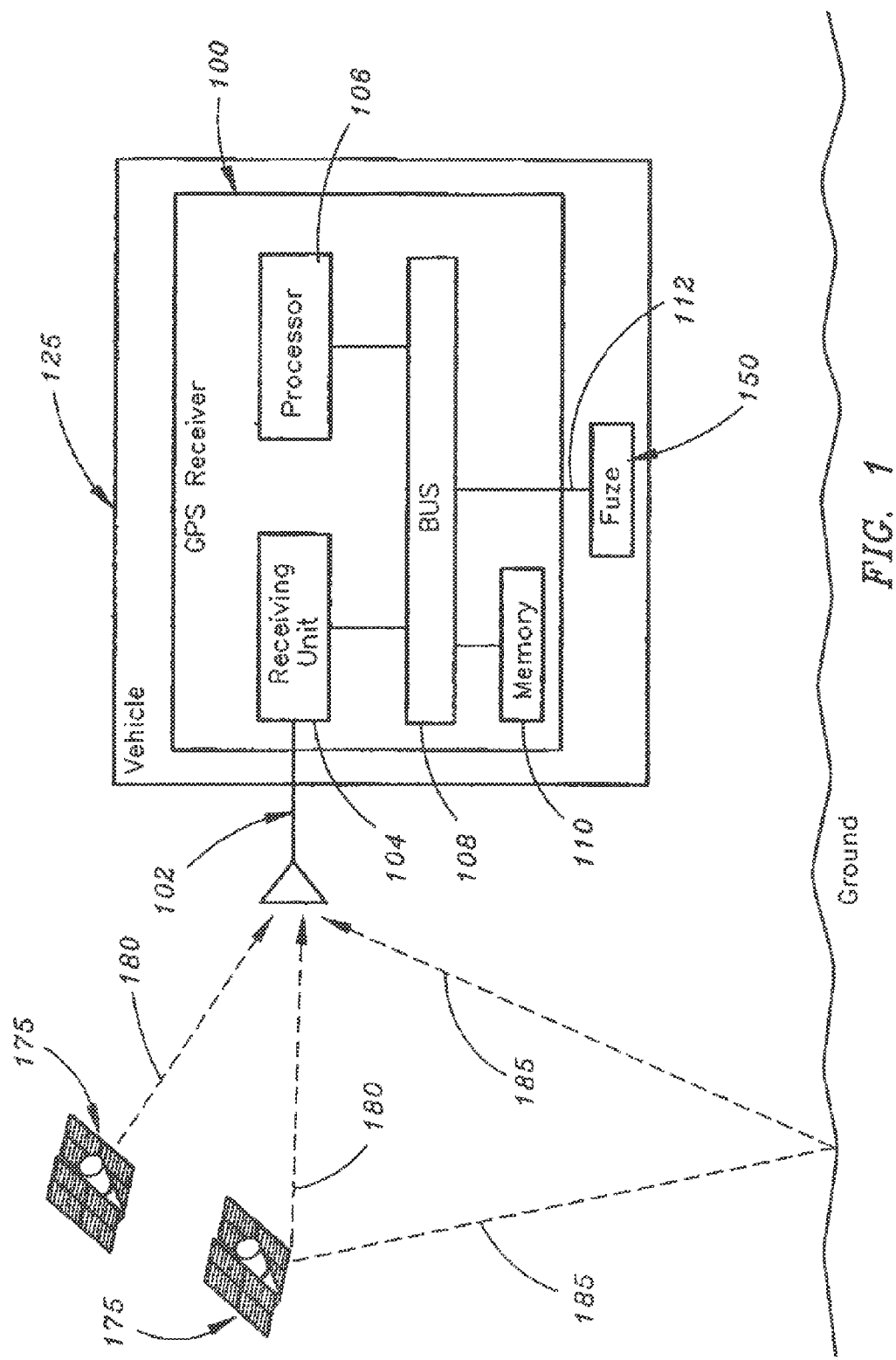
FIG. 1 is a block diagram schematic of a positioning system, said positioning system being implemented on-board a vehicle in accordance with an exemplary embodiment of the present disclosure.

Referring to FIG. 1, a positioning receiver in accordance with an embodiment of the present disclosure is shown. In an embodiment, the positioning receiver 100 may be a Global Navigation Satellite Systems (GNSS) receiver 100. For example, the GNSS receiver 100 may be a GPS receiver 100 such as a NavStorm™+ GPS receiver produced by Rockwell Collins and/or a Rockwell Collins GPS Selective Availability and Anti-Spoofing Module (SAASM)-based receiver. In further embodiments, the receiver 100 may be a non-GPS receiver. In still further embodiments, the receiver 100 may be implemented on-board a vehicle 125. For instance, the vehicle 125 may be a projectile, an ordinance (ex—a munition), an aircraft, and/or a spacecraft.

In exemplary embodiments, the positioning receiver 100 may be connected to and/or may include at least one antenna 102. The antenna 102 may be configured for receiving signals, such as satellite signals (exs.—satellite navigation signals, satellite positioning signals). For example, if the positioning receiver 100 is a GPS positioning receiver, the antenna 102 may be a GPS antenna 102 configured for receiving GPS signals transmitted by GPS satellites. In further embodiments, the antenna 102 may be a dual frequency, dual polarity Dielectric Resonator Antenna (DRA), an edge slot antenna, or a patch antenna. In still further embodiments, one antenna 102 included in the at least one antenna 102 may be a directional left-hand circular polarization antenna 102 for promoting improved reception of multipath signals.

In an embodiment, the positioning receiver 100 may include a receiving unit 104. The receiving unit 104 may be connected to the antenna(s) 102 and may be configured for receiving RF inputs provided by the antenna(s) 102, said RF inputs including the received signals. For example, if the positioning receiver 100 is a GPS receiver, the receiving unit 104 may be a GPS receiving unit 104 configured for receiving RF inputs provided by GPS antennas.

In exemplary embodiments, the positioning receiver 100 may include a processor 106. The processor 106 may be connected to the receiving unit 104. For instance, the processor 106 may be connected to the receiving unit 104 via an interface (ex.—bus) 108, said processor 106 and receiving unit 104 each being connected to the bus 108. The receiving unit 104 may be configured for providing the received RF inputs to the processor 106. The processor 106 may be configured for processing said RF inputs. The processing of said RF inputs by the processor 106 will be discussed in detail below. In further embodiments, the positioning receiver 100 may include a memory 110, said memory 110 being connected to the processor 106. For example, the memory 110 may be connected to the bus 108, and thus, may be connected thereby to the processor 106. In embodiments in which the vehicle 125 is an ordinance (ex—a munition), the positioning receiver 100 may be connected to a mission processor and/or a triggering mechanism (ex.—fuze) 150 via an interface 112. For example, if said vehicle 125 is a munition (ex.—artillery shell), said fuze 150 may be implemented on-board said vehicle 125 and may be configured for detonating an explosive charge (ex.—payload) of the munition 125.

Figure 2:
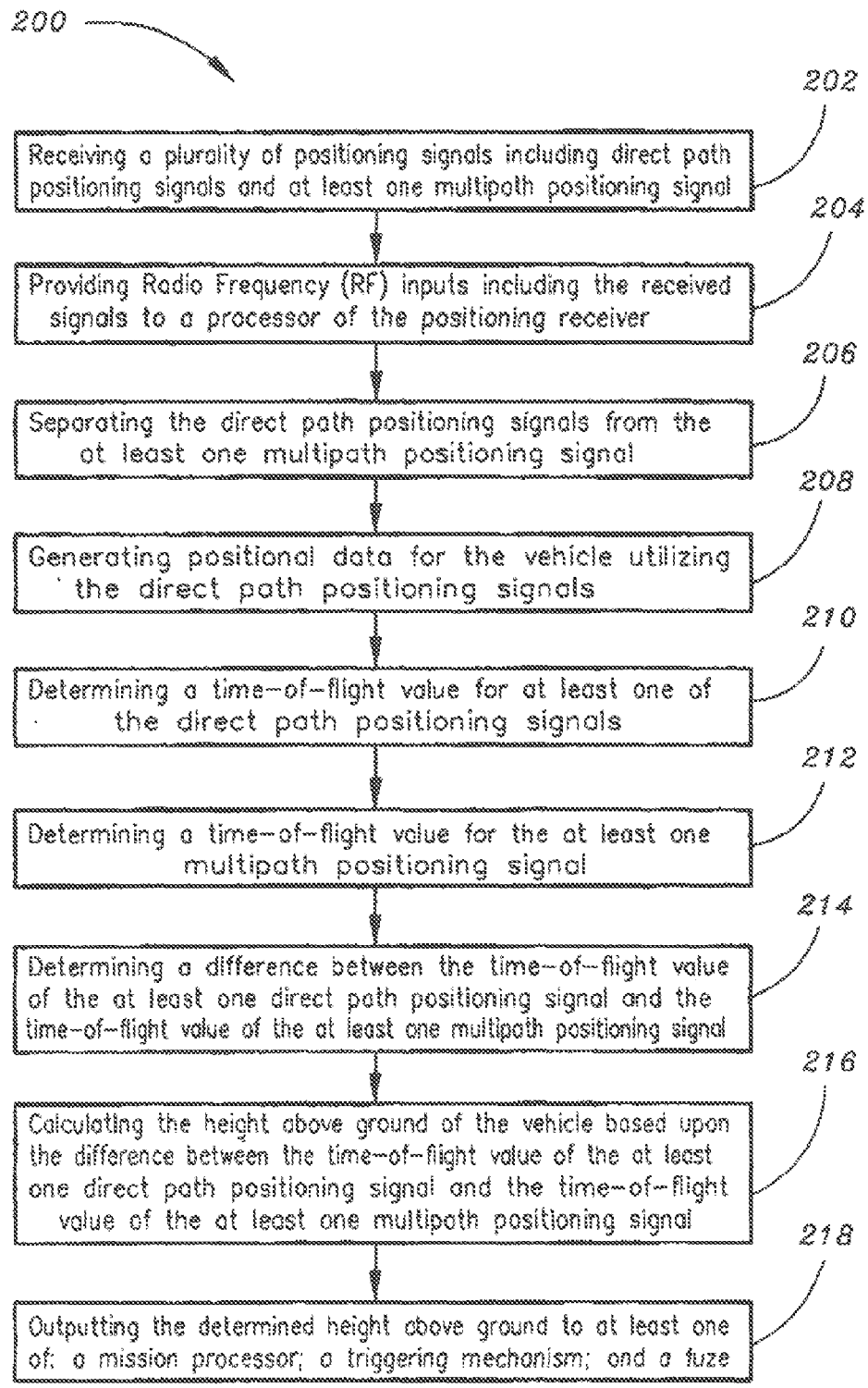
FIG. 2 is a flowchart illustrating a method for in-flight determination of a height above ground for a vehicle via a positioning receiver in accordance with an exemplary embodiment of the present disclosure.

Referring to FIG. 2, a flow chart is shown which illustrates a method for in-flight determination of a height above ground for a vehicle via a positioning receiver, such as via the positioning receiver 100 shown in FIG. 1, in accordance with an exemplary embodiment of the present disclosure. In an exemplary embodiment, the method 200 includes the step of receiving a plurality of positioning signals including direct path positioning signals and at least one multipath positioning signal 202. For example, the positioning receiver 100 may be a GPS positioning receiver 100 and may be configured for receiving a plurality of GPS satellite signals from a plurality of GPS satellites 175, said GPS satellite signals including direct path (exs.—line-of-sight, on-time) positioning signals 180 and at least one multipath (exs.—reflected, delayed, time-delayed) positioning signal 185. For instance, a direct path positioning signal 180 and a multipath positioning signal 185 may be received from a same GPS satellite 175 included in the plurality of GPS satellites 175, as shown in FIG. 1. In an exemplary embodiment, the antenna(s) 102 may receive the GPS satellite signals and provide RF inputs (said RF inputs including said signals) to the receiving unit 104 of the positioning receiver 100.

Figure 3:
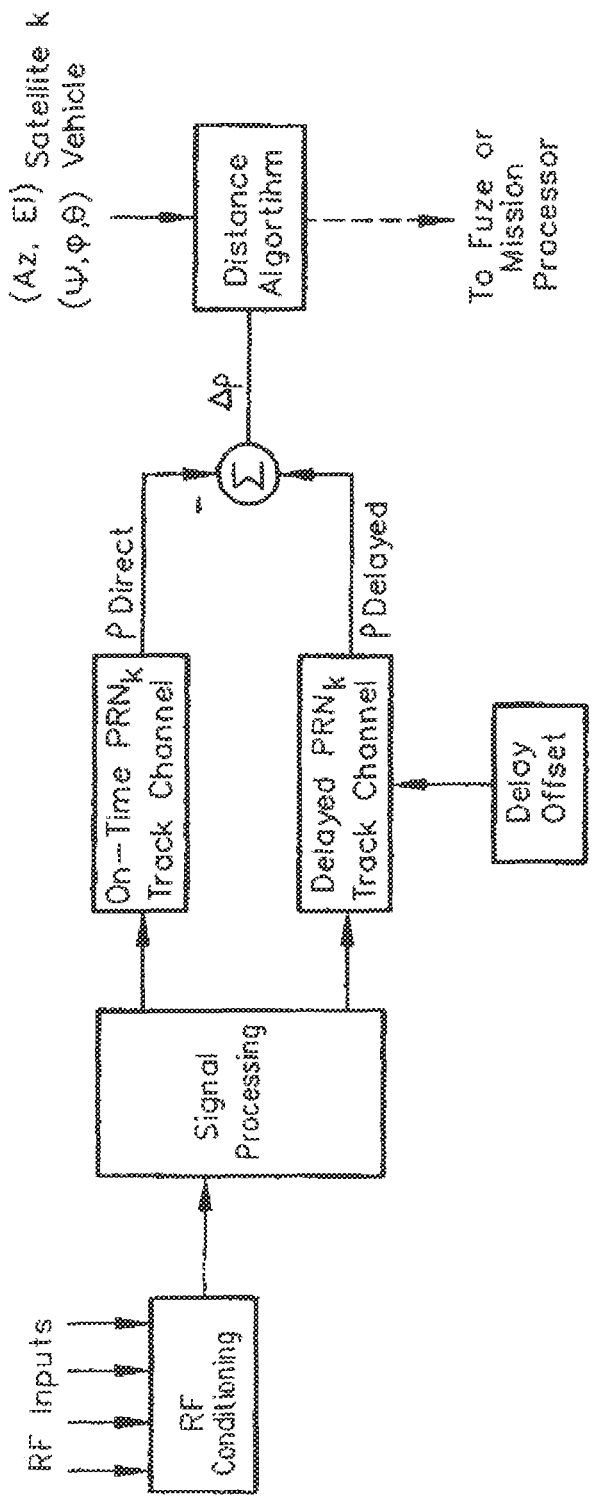
FIG. 3 is a functional diagram of distance determination utilizing GPS multipath, as performed by a positioning receiver of the positioning system shown in FIG. 1, in accordance with an exemplary embodiment of the present disclosure.

In further embodiments, the method 200 may include the step of providing RF inputs including the received signals to a processor of the positioning receiver 204. For instance, the RF inputs including the received signals (ex.—GPS signals) may be provided from the receiving unit 104 of the positioning receiver 100 to the processor 106 of the positioning receiver (as shown in FIG. 3). In an embodiment, as shown in FIG. 3, the RF inputs may be conditioned, such as via an RF conditioning unit (RFCU), before being provided to the processor 106.

In still further embodiments, the method 200 may further include the step of processing said received signals via the processor of the positioning receiver. In exemplary embodiments, processing said received signals may include separating the direct path positioning signals from the at least one multipath positioning signal 206. For example, as shown in FIG. 3, the direct path positioning signals and the at least one multipath positioning signal may be separated by the processor 106 by splitting the RF inputs received from the receiving unit 104 to two channels. The direct path positioning signals may be tracked in a first channel (ex.—an on-time tracking channel) included in the two channels, while the at least one multipath positioning signal may be tracked in a second channel (ex.—a delayed tracking channel) included in the two channels. Thus, in exemplary embodiments, the RF from the on-time tracking channel is duplicated in the delayed tracking channel and the search window is delayed by a predetermined amount, thereby allowing the positioning receiver 100 to search the duplicated channel (ex.—the delayed tracking channel) for the at least one multipath positioning signal.

In exemplary embodiments, processing said received signals may further include the step of generating positional data for the vehicle utilizing the direct path positioning signals 208. For instance, at a trajectory apogee for the vehicle 125, the positioning receiver 100 may, based upon the direct path positioning signals, provide a velocity of the vehicle 125 and an altitude of the vehicle 125 to a Distance algorithm (ex.—a Height Of Burst (HOB) algorithm) as initial conditions. In an exemplary embodiment, said HOB algorithm may be implemented in software which is being run on the processor 106 of the positioning receiver. Said initial conditions may be used to calculate a rough estimate of a height above ground and change(s) in height above ground for the vehicle 125, while the HOB algorithm (ex.—GPS HOB algorithm) searches for the at least one multipath positioning signal 185 from the plurality of satellites 175 (ex.—the visible, already-being-tracked satellites 175). For instance, the HOB algorithm may search for the at least one multipath positioning signal 185 from the plurality of satellites 175 by first checking highest elevation satellites included in the plurality of satellites 175, since the discrepancy in time-of-flight values for the at least one multipath signal 185 and the direct path signals would be greatest for said highest elevation satellites. Thus, at the trajectory apogee, the positioning receiver 100 may be tracking visible GPS signals and outputting a navigation (ex.—position, velocity, time, pseudorange and deltarange) solution based upon the received direct path positioning signals. Further, by bounding the search window using the initial conditions generated from the line-of-sight pseudorange and deltarange measurements, the GPS positioning receiver 100 may expedite acquisition of the at least one multipath positioning signal 185.

In further embodiments, processing said received signals may further include the steps of: determining a time-of-flight value for at least one of the direct path positioning signals 210; determining a time-of-flight value for the at least one multipath positioning signal 212; and determining a difference between the time-of-flight value of the at least one direct path positioning signal and the time-of-flight value of the at least one multipath positioning signal 214. In further embodiments, processing said received signals may further include the step of calculating the height above ground of the vehicle based upon the difference between the time-of-flight value of the at least one direct path positioning signal and the time-of-flight value of the at least one multipath positioning signal 216. For example, the HOB algorithm may utilize the difference between the time-of-flight value of the at least one direct path positioning signal and the time-of-flight value of the at least one multipath positioning signal; and may further utilize elevation angle(s) of the satellite(s), to determine the height above ground (exs.—distance to target, time-to-target) of the vehicle implementing the positioning receiver 100. Further, the positioning receiver 100 may be configured for continuously (ex.—dynamically) tracking direct path positioning signals and reflected path positioning signals for providing updates (ex.—sub-second updates) to the determined height above ground.

Estimation of height above ground may be based upon the height of the reflecting surface. The term "ground" as used above and herein may be any surface, including buildings, mountains, valleys, bodies of water, glaciers, etc., which could be considered a scattering field (ex.—a reflecting surface). Simplification of the ground complexity to a flat, homogenous, reflective plane may be helpful for understanding the approach without losing generality and applicability to more complex topography, including urban scenarios. The added complexity of height variations of the scattering surface(s) may introduce errors which may be accounted for by using (ex.—tracking) multiple multipath signals for providing a clearer estimation of a true height above ground of the vehicle 125.

As mentioned above, in embodiments in which the vehicle 125 is an ordinance (ex—a munition), the positioning receiver 100 may be connected to a mission processor and/or a triggering mechanism (ex.—fuze) 150 via an interface 112. For example, if said vehicle 125 is a munition (ex.—artillery shell), said fuze 150 may be implemented on-board said vehicle 125 and may be configured for detonating an explosive charge (ex.—payload) of the munition 125. In such embodiments, the method 200 may further include the step of outputting the determined height above ground to the mission processor and/or triggering mechanism (ex.—fuze) 218. In further embodiments, the mission processor and/or triggering mechanism (ex.—fuze) may be configured for receiving the output height above ground from the positioning receiver, comparing the received height above ground to a pre-determined height of burst for the ordinance, and detonating an explosive charge (ex.—payload) of the munition based upon said comparison. For example, the pre-determined height of burst may be selected such that, if the explosive charge of the munition is detonated when the output height above ground matches the pre-determined height of burst, the munition will deliver an intentional amount of explosive burst as accurately and efficiently as possible. Thus, the positioning receiver 100 (ex.—GPS receiver) 100 described herein may utilize multi-path signals as described above to operate as both a navigation solution (ex.—a GPS navigation solution) and a Height-of-Burst sensor, thereby obviating the need for separate HOB sensor hardware. Further, the positioning receiver 100 may be operatively implemented in conjunction with the antenna(s) 102, and the mission processor/triggering mechanism (ex.—fuse) 150 as described herein to collectively provide a positioning system, which may be implemented on-board the vehicle 125.

In further embodiments, the herein disclosed technology may have other applications, such as space situational awareness, formation flying and collision avoidance.

The solution presented herein may include hardware and software that is approved Transmission Security (TRANSEC) from Electromagnetic Counter Measures (ECM) performance and reverse-engineering security. The passive nature of the technology (ex.—the system does not generate an auxiliary signal) provides stealth approach to the target.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a non-transitory computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A positioning receiver for implementation on-board a vehicle, said positioning receiver comprising:
   a receiving unit, the receiving unit being configured for receiving a plurality of positioning signals including direct path positioning signals and at least one reflected multipath positioning signal; and
   a processor, the processor being connected to the receiving unit, the processor being configured for: receiving Radio Frequency (RF) inputs from the receiving unit, said RF inputs including the received signals; separating the direct path positioning signals from the at least one reflected multipath positioning signal; generating positional data for the vehicle based upon the direct path positioning signals; determining a time-of-flight value for at least one of the direct path positioning signals; determining a time-of-flight value for the at least one reflected multipath positioning signal; determining a difference between the time-of-flight value of the at least one direct path positioning signal and the time-of-flight value of the at least one reflected multipath positioning signal; and calculating the height above ground of the vehicle based upon the difference between the time-of-flight value of the at least one direct path positioning signal and the time-of-flight value of the at least one reflected multipath positioning signal.

2. A positioning receiver as claimed in claim 1, wherein the positioning receiver is configured for outputting, via an interface, the determined height above ground to at least one of the mission processor, the triggering mechanism, or a fuze.

3. A positioning receiver as claimed in claim 1, wherein the vehicle is one of: an aircraft; a spacecraft; and an ordnance.

4. A positioning system for implementation on-board a vehicle, said positioning system comprising:
   a receiving unit, the receiving unit being configured for receiving a plurality of satellite navigation signals, said plurality of satellite navigation signals including direct path positioning signals and at least one reflected multipath positioning signal;
   a processor, the processor being connected to the receiving unit, the processor being configured for: receiving Radio Frequency (RF) inputs from the receiving unit, said RF inputs including the received signals; separating the direct path positioning signals from the at least one reflected multipath positioning signal; generating positional data for the vehicle based upon the direct path positioning signals; determining a time-of-flight value for at least one of the direct path positioning signals; determining a time-of-flight value for the at least one reflected multipath positioning signal; determining a difference between the time-of-flight value of the at least one direct path positioning signal and the time-of-flight value of the at least one reflected multipath positioning signal; calculating the height above ground of the vehicle based upon the difference between the time-of-flight value of the at least one direct path positioning signal and the time-of-flight value of the at least one reflected multipath positioning signal; and outputting the determined height above ground via an interface; and
   a fuze, said fuze being connected to the processor via the interface, said fuze being configured for receiving the output determined height above ground from the processor.

5. A positioning system as claimed in claim 4, wherein the vehicle is an ordnance.

6. A positioning system as claimed in claim 5, wherein the fuze is configured for comparing the received height above ground to a pre-determined height of burst for the ordnance, and detonating an explosive charge of the ordnance based upon said comparison.

7. A positioning system as claimed in claim 4, further comprising:
an antenna, said antenna being connected to the receiving unit, said antenna further configured for receiving the plurality of satellite navigation signals from a plurality of satellites and for providing said plurality of satellite navigation signals to the receiving unit.

8. A positioning system as claimed in claim 4, wherein the satellite navigation signals are Global Positioning System signals.

9. A method for in-flight determination of a height above ground for a vehicle via a positioning receiver, said method comprising:
receiving a plurality of positioning signals including direct path positioning signals and at least one reflected multipath positioning signal;
providing Radio Frequency (RF) inputs including the received signals to a processor of the positioning receiver;
separating the direct path positioning signals from the at least one reflected multipath positioning signal; and
generating positional data for the vehicle utilizing the direct path positioning signals.

10. A method as claimed in claim 9, further comprising:
determining a time-of-flight value for at least one of the direct path positioning signals.

11. A method as claimed in claim 10, further comprising:
determining a time-of-flight value for the at least one reflected multipath positioning signal.

12. A method as claimed in claim 11, further comprising:
determining a difference between the time-of-flight value of the at least one direct path positioning signal and the time-of-flight value of the at least one reflected multipath positioning signal.

13. A method as claimed in claim 12, further comprising:
calculating the height above ground of the vehicle based upon the difference between the time-of-flight value of the at least one direct path positioning signal and the time-of-flight value of the at least one reflected multipath positioning signal.

14. A method as claimed in claim 13, further comprising:
outputting the determined height above ground to at least one of a mission processor, a triggering mechanism, or a fuze.

15. A computer program product, comprising:
a non-transitory computer-readable storage medium including computer-usable program code for performing a method for in-flight determination of a height above ground for a vehicle via a positioning receiver, the computer program product including:
computer-usable program code for receiving a plurality of positioning signals including direct path positioning signals and at least one reflected multipath positioning signal;
computer-usable program code for providing Radio Frequency (RF) inputs including the received signals to a processor of the positioning receiver;
computer-usable program code for separating the direct path positioning signals from the at least one reflected multipath positioning signal; and
computer-usable program code for generating positional data for the vehicle utilizing the direct path positioning signals.

16. A computer program product as claimed in claim 15, further comprising:
computer-usable program code for determining a time-of-flight value for at least one of the direct path positioning signals.

17. A computer program product as claimed in claim 16, further comprising:
computer-usable program code for determining a time-of-flight value for the at least one reflected multipath positioning signal.

18. A computer program product as claimed in claim 17, further comprising:
computer-usable program code for determining a difference between the time-of-flight value of the at least one direct path positioning signal and the time-of-flight value of the at least one reflected multipath positioning signal.

19. A computer program product as claimed in claim 18, further comprising:
computer-usable program code for calculating the height above ground of the vehicle based upon the difference between the time-of-flight value of the at least one direct path positioning signal and the time-of-flight value of the at least one reflected multipath positioning signal.

20. A computer program product as claimed in claim 19, further comprising:
computer-usable program code for outputting the determined height above ground to at least one of, a mission processor, a triggering mechanism, or a fuze.

* * * * *